(No Model.)
T. McCOSH.
BARB WIRE LIFTER AND CARRIER.
No. 264,547. Patented Sept. 19, 1882.
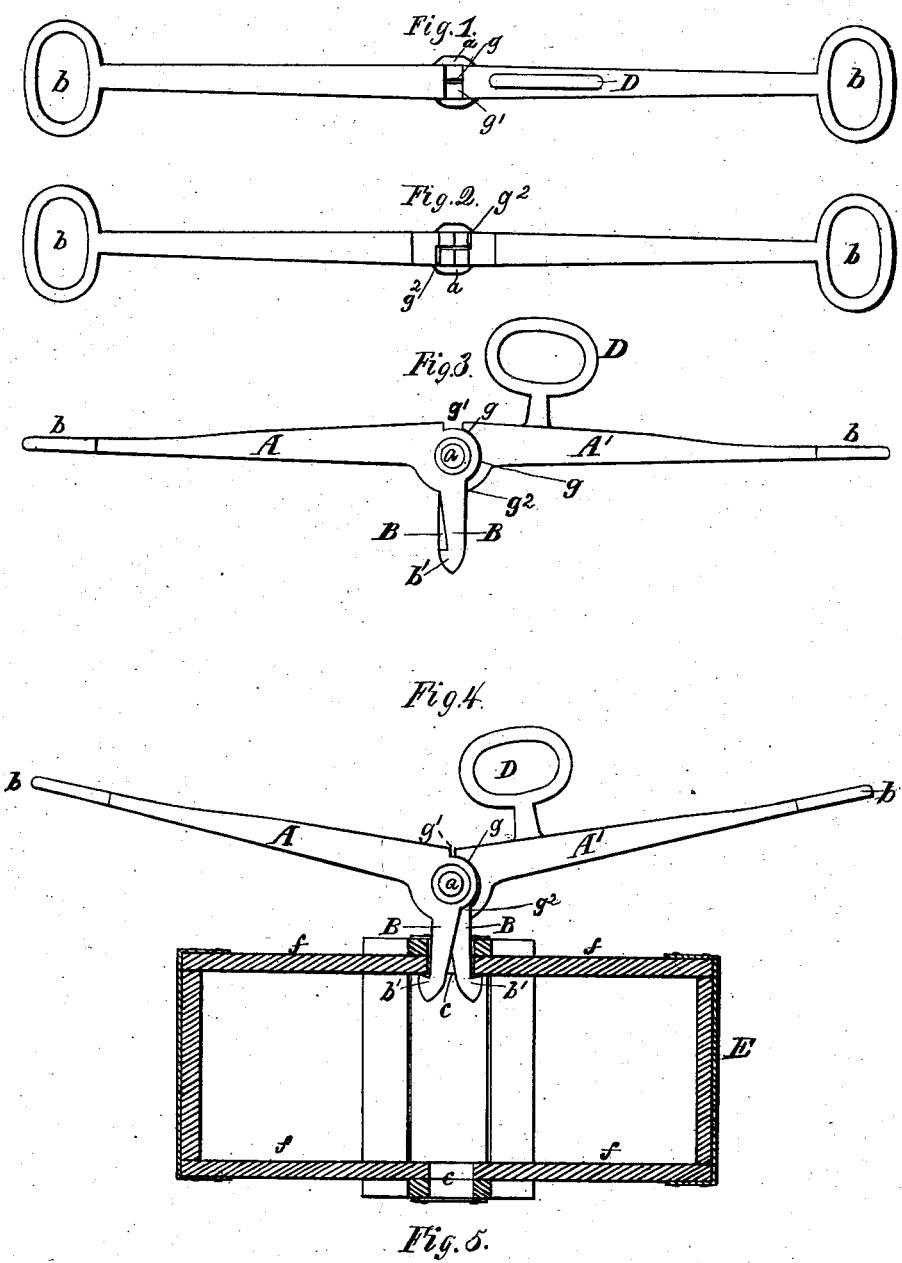
Witnesses:
B. Carlyle Fenwick.
Robt. L. Fenwick.
Inventor.
Thompson McCosh
by his atty
Fenwick & Lawrence

UNITED STATES PATENT OFFICE.

THOMPSON McCOSH, OF BURLINGTON, IOWA.

BARB-WIRE LIFTER AND CARRIER.

SPECIFICATION forming part of Letters Patent No. 264,547, dated September 19, 1882.

Application filed August 10, 1882. (No model.)

*To all whom it may concern:*

Be it known that I, THOMPSON McCOSH, a citizen of the United States, residing at Burlington, in the county of Des Moines and State of Iowa, have invented a new and useful Barb-Wire Lifter and Carrier, of which the following is a specification, reference being had to the annexed drawings, forming a part thereof, in which like letters indicate the same parts in the several figures.

The object of my invention is to provide an improved means whereby the reels upon which barbed fence-wire has been wound for transportation can be handled and carried from place to place with ease and without danger of lacerating or cutting the persons handling the same.

In the drawings, Figure 1 is a top view of my barb-wire lifter and carrier, and Fig. 2 is an inverted plan view of the same. Fig. 3 is a side view of the said lifter and carrier, showing the same closed and ready to be applied to a reel upon which barbed wire has been wound. Fig. 4 is a side view of the lifter and carrier, its dogs or hooked grippers having been inserted into the central aperture of one of said reels and the dogs expanded from their position shown in Fig. 3 to their position shown in Fig. 4; and Fig. 5 is an end view of my barb-wire lifter and carrier.

As shown in the drawings, my barb-wire lifter and carrier is composed of two main parts, A A', connected together by a rule-joint, as $g$, indicated in the figures, and held in position by a rivet, $a$, said rule-joint having peculiar limitation-stops, $g'$ $g^2$. The main parts A A', when connected together, are unitedly of sufficient length to extend beyond the greatest diameter of a barbed-wire reel, as signified in Fig. 4, and at their outer ends are formed with loops or handles $b$, which may be grasped by the hands of persons in moving the reel from place to place. Said main portions A A' are constructed with a dog or gripper, B, having a hooked terminating end, as $b'$, so that when the implement is inserted into the central aperture, $c$, of a barbed-wire reel, E, as shown in central vertical section in Fig. 4, the hooks $b'$ will be expanded apart and take a hold upon the under side of one of the cross-arms $f$ of the reel, as shown, thus holding the reel securely upon the dogs B B while the reel is being carried from place to place. The parts A A', when in position, as shown in Fig. 4, will allow the handles $b$ to be grasped by a person and the reel to be carried without coming in contact with the persons carrying it, and thus all danger of lacerating or cutting such persons by the barbs upon the wire which is wound upon the reel is avoided.

One of the main parts—as, for example, A'—is constructed with a handle, as at D, so that when the lifter and carrier has been used, as indicated in Fig. 4, the several parts may be made to assume the position shown in Fig. 3, and thus permit the dogs to be withdrawn from the aperture $c$ of the reel E, by grasping and pulling upon said handle D.

It will be seen that in the act of carrying a wire-barb reel by my lifter and carrier the parts A A' act as levers to hold the dogs B B to their work, and thus not allow them to become detached from the reel during the act of carrying it from place to place.

It will be seen that the dogs fit against and during articulation move upon each other, and also that the rule-joint $g$ is so constructed at $g'$ as to allow the necessary downward deflection of the parts A A' from the position shown in Fig. 3 to the position shown in Fig. 4, for the purpose of insuring a positive hooking of the ends $b'$ $b'$ of the dogs B B beneath the cross-bar $f$ of the reel E. It will also be seen that this joint $g$ forms stops at $g^2$ for the purpose of limiting the movement of the dogs B B from their position shown in Fig. 4 to their position shown in Fig. 3.

What I claim as my invention, and desire to secure by Letters Patent, is—

1. A lifter and carrier for barb-wire reels, having main portions, as A A', provided with dogs B, having hooked ends $b'$, and which fit against and move upon each other, substantially as and for the purpose described.

2. The parts A A' of the lifter, provided with hooking-dogs B B, and united by a joint, $g$, which forms limitation-stops $g'$ $g^2$, substantially as and for the purpose described.

3. The combination of the loop D with the hooking-lifter, substantially as and for the purpose described.

THOMPSON McCOSH.

Witnesses:
E. S. HUSTON,
W. E. BURKE.